(12) United States Patent
Hatakeyama et al.

(10) Patent No.: US 10,377,207 B2
(45) Date of Patent: Aug. 13, 2019

(54) VEHICLE AIR-CONDITIONING DEVICE

(71) Applicant: CALSONIC KANSEI CORPORATION, Saitama-shi, Saitama (JP)

(72) Inventors: Jun Hatakeyama, Saitama (JP); Satoshi Ogihara, Saitama (JP); Hiroyuki Ohno, Saitama (JP)

(73) Assignee: CALSONIC KANSEI CORPORATION, Saitama-Shi (JP)

( * ) Notice: Subject to any disclaimer, the term of this patent is extended or adjusted under 35 U.S.C. 154(b) by 99 days.

(21) Appl. No.: 15/529,658

(22) PCT Filed: Nov. 25, 2015

(86) PCT No.: PCT/JP2015/082976
§ 371 (c)(1),
(2) Date: May 25, 2017

(87) PCT Pub. No.: WO2016/084817
PCT Pub. Date: Jun. 2, 2016

(65) Prior Publication Data
US 2017/0326945 A1    Nov. 16, 2017

(30) Foreign Application Priority Data

Nov. 27, 2014 (JP) .................................. 2014-239715
Nov. 20, 2015 (JP) .................................. 2015-227304

(51) Int. Cl.
*B60H 1/00* (2006.01)
*B60H 1/32* (2006.01)

(52) U.S. Cl.
CPC ..... *B60H 1/00807* (2013.01); *B60H 1/00385* (2013.01); *B60H 1/00885* (2013.01);
(Continued)

(58) Field of Classification Search
CPC ........... B60H 1/00385; B60H 1/00807; B60H 1/00885; B60H 1/00921; B60H 1/3211;
(Continued)

(56) References Cited

U.S. PATENT DOCUMENTS 6,640,889 B1 * 11/2003 Harte ................. B60H 1/00885
165/202
2011/0120146 A1    5/2011 Ota et al.
(Continued)

FOREIGN PATENT DOCUMENTS

JP     H10-166847 A    6/1998
JP     2004-058951 A   2/2004
(Continued)

*Primary Examiner* — Henry T Crenshaw
(74) *Attorney, Agent, or Firm* — Foley & Lardner LLP

(57) ABSTRACT

A vehicle air-conditioning device includes: a first coolant-water circulation path in which coolant water passes through an engine; a second coolant-water circulation path that is communicated with the first coolant-water circulation path and in which the coolant water passes through a vehicle-cabin radiator; a shutting off mechanism that shuts off, when switched to a shut-off state, the communication between the first coolant-water circulation path and the second coolant-water circulation path; and a refrigeration cycle. The refrigeration cycle has: a compressor for compressing cooling medium; a secondary evaporator in which the cooling medium absorbs heat from the coolant water in the first coolant-water circulation path; a secondary condenser that releases heat of the cooling medium that has absorbed the heat at the secondary evaporator to the coolant water in the second coolant-water circulation path; and a secondary expander that decompresses the cooling medium that has passed through the secondary condenser.

7 Claims, 12 Drawing Sheets

(52) U.S. Cl.
CPC ......... *B60H 1/00921* (2013.01); *B60H 1/323* (2013.01); *B60H 1/3211* (2013.01); *B60H 1/3213* (2013.01); *B60H 2001/00928* (2013.01)

(58) Field of Classification Search
CPC .................. B60H 1/3213; B60H 1/323; B60H 2001/00928
USPC ........................................................... 62/156
See application file for complete search history.

(56) References Cited

U.S. PATENT DOCUMENTS

| | | | | |
|---|---|---|---|---|
| 2015/0330351 | A1* | 11/2015 | Ragazzi | F02N 19/04 123/552 |
| 2016/0001634 | A1* | 1/2016 | Terada | B60H 1/00921 62/160 |
| 2016/0001635 | A1* | 1/2016 | Noda | B60H 1/00921 62/160 |
| 2016/0033175 | A1* | 2/2016 | Ragazzi | F25B 13/00 62/115 |
| 2016/0101666 | A1* | 4/2016 | Sugimura | B60H 1/00899 165/202 |
| 2016/0129757 | A1* | 5/2016 | Kodera | F25B 6/04 165/202 |
| 2016/0137031 | A1* | 5/2016 | Noda | B60H 1/03 165/203 |
| 2016/0137032 | A1* | 5/2016 | Kuroda | B60H 1/08 165/104.32 |
| 2016/0159199 | A1* | 6/2016 | Kuroda | F25B 5/04 165/202 |
| 2016/0159203 | A1* | 6/2016 | Kuroda | F25B 5/02 62/160 |

FOREIGN PATENT DOCUMENTS

| | | |
|---|---|---|
| JP | 2011-131871 A | 7/2011 |
| JP | 2012-001141 A | 1/2012 |

* cited by examiner

VEHICLE AIR-CONDITIONING DEVICE

TECHNICAL FIELD

The present invention relates to a vehicle air-conditioning device.

BACKGROUND ART

JP2011-131871A discloses a vehicle air-conditioning device that is mounted on a hybrid vehicle and that circulates engine coolant water between a heater core and an engine to heat air that has passed through an evaporator by performing heat exchange between the engine coolant water and the air. This vehicle air-conditioning device includes a heat-absorbing side heat exchanger that is provided at the downstream side of the heater core, a heat-releasing side heat exchanger that is provided at the upstream side of the heater core, and a Peltier device that is provided between the heat-absorbing side heat exchanger and the heat-releasing side heat exchanger. With this device, when the engine is stopped, temperature of the engine coolant water that flows into the heater core is prevented from being decreased by transferring heat via the Peltier device from the engine coolant water flowing on the downstream side of the heater core to the engine coolant water flowing on the upstream side of the heater core.

SUMMARY OF INVENTION

However, with the vehicle air-conditioning device disclosed in JP2011-131871A, the engine coolant water whose temperature has been decreased at the heat-absorbing side heat exchanger is circulated and introduced again to the heat-releasing side heat exchanger. Therefore, there is a risk in that energy efficiency may be deteriorated due to reheating of the engine coolant water that has been cooled once.

An object of the present invention is to suppress deterioration of energy efficiency due to reheating of coolant water.

According to one aspect of the present invention, a vehicle air-conditioning device having a vehicle-cabin radiator for heating air guided into a vehicle cabin of a vehicle, includes: a first coolant-water circulation path in which coolant water passes through an engine; a second coolant-water circulation path communicated with the first coolant-water circulation path and in which the coolant water passes through the vehicle-cabin radiator; a shutting off mechanism configured to, when switched to a shut-off state, shut off communication between the first coolant-water circulation path and the second coolant-water circulation path; and a refrigeration cycle having a compressor for compressing cooling medium, a secondary evaporator in which the cooling medium absorbs heat from the coolant water in the first coolant-water circulation path, a secondary condenser for releasing heat of the cooling medium that has absorbed the heat at the secondary evaporator to the coolant water in the second coolant-water circulation path, and a secondary expander for decompressing the cooling medium that has passed through the secondary condenser.

In this aspect, by a refrigeration cycle, the heat is transferred via cooling medium from a first coolant-water circulation path in which coolant water passes through an engine to a second coolant-water circulation path in which the coolant water passes through a vehicle-cabin radiator. In addition, the communication through the first coolant-water circulation path and the second coolant-water circulation path can be shut off by a shutting off mechanism. Therefore, when the shutting off mechanism is switched to a shut-off state, the coolant water circulating in the second coolant-water circulation path is prevented from being reheated after cooled once. Thus, it is possible to suppress deterioration of the energy efficiency caused by reheating of the coolant water.

DESCRIPTION OF EMBODIMENT

An embodiment of the present invention will be described below with reference to the drawings.

(First Embodiment)

Figure 1:
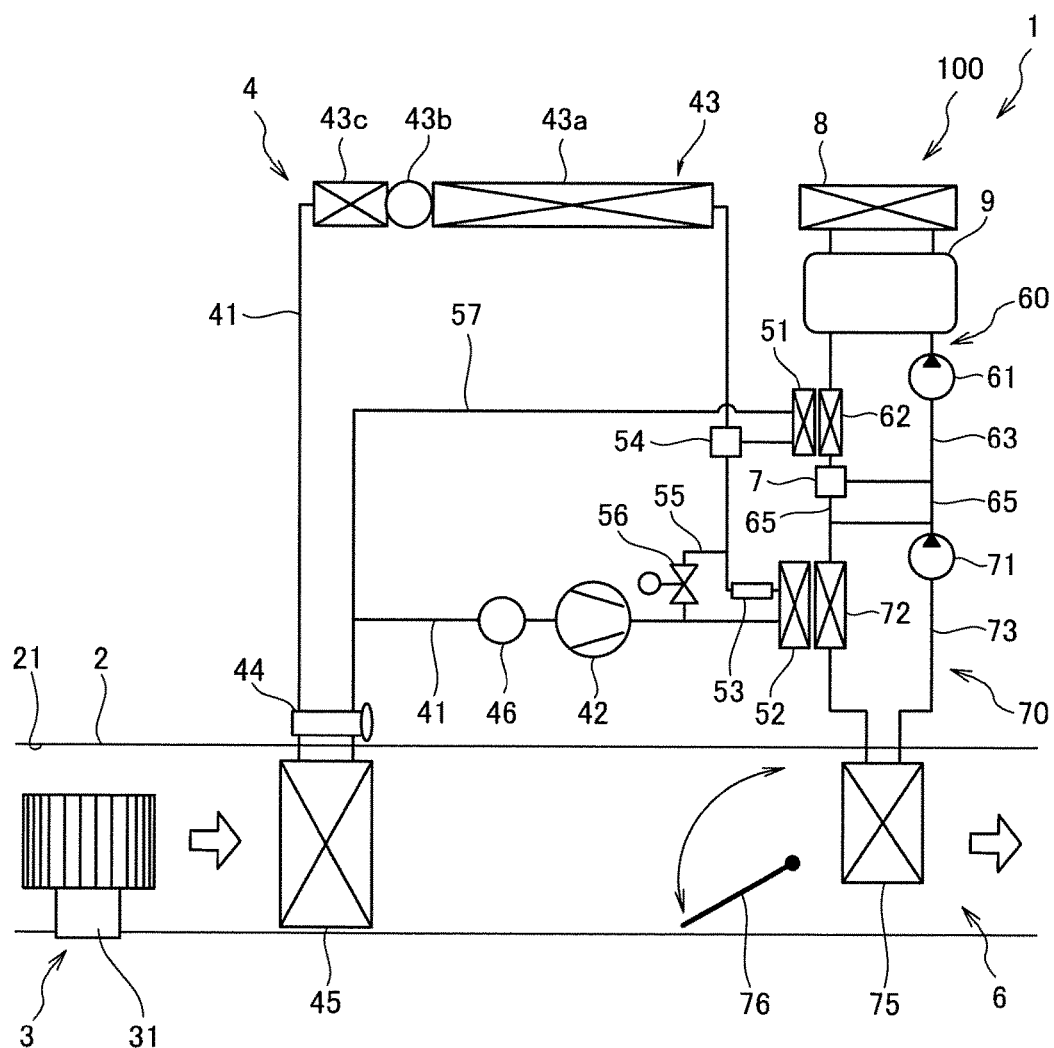
FIG. 1 is a configuration diagram of a vehicle air-conditioning device according to a first embodiment of the present invention.

An overall configuration of a vehicle air-conditioning device 100 according to a first embodiment of the present invention will be described with reference to FIG. 1.

The vehicle air-conditioning device 100 is an air-conditioning device that is mounted on a vehicle 1, such as a hybrid vehicle (a Hybrid Electric Vehicle: HEV), having an engine-stopping function that stops an engine when the vehicle is stopped or driven. The vehicle 1 includes an engine 9 that is used for driving wheels and generating electricity and a radiator 8 that cools the engine 9 with the circulating coolant water.

The vehicle air-conditioning device 100 includes an air duct 2 having an air intake port 21, a blower unit 3 that introduces air from the air intake port 21 into the air duct 2, a heat pump unit 4 serving as a refrigeration cycle that cools and dehumidifies the air flowing through the air duct 2, and a heater unit 6 that warms the air flowing through the air duct 2.

The air that has been sucked in from the air intake port 21 flows through the air duct 2. Outside air of a vehicle cabin and inside air of the vehicle cabin are sucked into the air duct 2. The air that has passed through the air duct 2 is guided into the vehicle cabin.

The blower unit 3 has a blower 31 serving as a blower device for sending the air into the air duct 2 by rotation about the central axis. The blower unit 3 has an intake door (not shown) for opening and closing an outside air intake for taking in the outside air of the vehicle cabin and an inside air intake for taking in the inside air of the vehicle cabin. The blower unit 3 opens and closes or adjusts an opening degrees of the outside air intake and the inside air intake, and thereby, it is possible to adjust the amount of the outside air of the vehicle cabin and the inside air of the vehicle cabin sucked.

The heat pump unit 4 has a cooling medium circulation circuit 41 through which cooling medium is circulated, an electric compressor 42 serving as a compressor that is driven by an electric motor (not shown) and compresses the cooling medium, an outside heat exchanger 43 that, at the time of a cooling-operation, condenses the cooling medium, which has been compressed by the electric compressor 42, by releasing the heat thereof, an expansion valve 44 serving as a primary expander that lowers temperature of the condensed cooling medium by decompressing and expanding the cooling medium, and an evaporator 45 serving as a primary evaporator that cools the air flowing through the air duct 2 with the cooling medium that has been expanded and the temperature of which has been lowered.

Although the electric compressor 42 is, for example, a vane-type rotary compressor, a scroll type compressor may be used. A rotating speed of the electric compressor 42 is controlled by an instruction signal from a controller (not shown).

An accumulator 46 is provided on the upstream side of the electric compressor 42. The accumulator 46 temporarily stores excessive portion of the cooling medium sent from the evaporator 45 and sends only the gaseous cooling medium to the electric compressor 42.

At the time of the cooling-operation, the outside heat exchanger 43 liquefies the cooling medium by cooling it by the heat exchange with the outside air. At this time, the outside heat exchanger 43 has a primary outside heat exchanger 43a that liquefies the gaseous cooling medium, a liquid tank 43b that stores liquid cooling medium, and a supercooling outside heat exchanger 43c that further cools the liquid cooling medium.

The expansion valve 44 causes the liquid cooling medium that has been cooled by the outside heat exchanger 43 to expand and further lowers its temperature. The expansion valve 44 has a temperature-sensing tube portion (not shown) that is attached on the exit side of the evaporator 45, and an opening degree thereof is automatically adjusted such that a degree of superheating of the cooling medium at the exit side of the evaporator 45 is maintained at a predetermined value.

The evaporator 45 performs the heat exchange between the liquid cooling medium that has been decompressed by the expansion valve 44 and the air flowing through the air duct 2. The evaporator 45 is provided in the air duct 2, and cools and dehumidifies the air flowing through the air duct 2. In the evaporator 45, the liquid cooling medium is evaporated by the heat of the air flowing through the air duct 2 and becomes the gaseous cooling medium. The gaseous cooling medium that has been evaporated by the evaporator 45 is supplied again to the electric compressor 42 through the accumulator 46.

In addition, the heat pump unit 4 further has an evaporator 51 serving as a secondary evaporator at which the cooling medium absorbs the heat from the coolant water in an engine-cooling circuit 60, which will be described later, a condenser 52 serving as a secondary condenser that releases the heat of the cooling medium that has absorbed the heat at the evaporator 51 into the coolant water in a heater circuit 70, which will be described later, an orifice 53 serving as a secondary expander that decompresses the cooling medium that has passed through the condenser 52, a three-way valve 54 serving as a switching valve that switches a state in which the cooling medium that has been compressed by the electric compressor 42 is guided to the evaporator 51 and a state in which the cooling medium is guided to the evaporator 45, a bypass path 55 that circulates the cooling medium that has been compressed by the electric compressor 42 by bypassing the orifice 53, and an open/close valve 56 serving as a bypass valve that opens and closes the bypass path 55.

The evaporator 51 performs the heat exchange between the cooling medium, which has being decompressed by passing through the condenser 52 and the orifice 53, and a radiator 62, which will be described later, of the engine-cooling circuit 60. The gaseous cooling medium evaporated by the evaporator 51 is supplied again to the electric compressor 42 through the accumulator 46.

The condenser 52 cools the cooling medium through the heat exchange with a heat absorber 72 of the heater circuit 70, which will be described later.

The orifice 53 reduces the pressure by restricting flow of the cooling medium. The orifice 53 causes the cooling medium that has been cooled by the condenser 52 to expand and further lowers its temperature. Instead of using the orifice 53, a thermostatic expansion valve or a capillary tube may be used as a secondary expander.

The three-way valve 54 is switched by the instruction signal from the controller. When the three-way valve 54 is switched such that the cooling medium that has been compressed by the electric compressor 42 is guided to the evaporator 45, the cooling medium is supplied again to the electric compressor 42 by passing through the outside heat exchanger 43, the expansion valve 44, the evaporator 45, and the accumulator 46. On the other hand, when the three-way valve 54 is switched such that the state in which the cooling medium that has been compressed by the electric compressor 42 is guided to the evaporator 51, the cooling medium passes through the evaporator 51, and thereafter, flows through a return path 57 and is supplied again to the electric compressor 42 through the accumulator 46.

The bypass path 55 achieves communication between upstream of the condenser 52 and downstream of the orifice 53 in the cooling medium circulation circuit 41.

The open/close valve 56 is switched by the instruction signal from the controller. When the open/close valve 56 is switched to an opened state, the bypass path 55 is opened, and when the open/close valve 56 is switched to a closed state, the bypass path 55 is closed. When the bypass path 55 is opened by the open/close valve 56, the cooling medium that has been guided from the electric compressor 42 bypasses the condenser 52 and the orifice 53, and is guided to the three-way valve 54 without being decompressed. Instead of using the open/close valve 56, it may be possible to use a three-way valve that switches a state in which the cooling medium that has been guided from the electric compressor 42 is guided to the condenser 52 and a state in which the cooling medium is guided to the bypass path 55.

The heater unit 6 has the engine-cooling circuit 60 that cools the engine 9 with the coolant water, the heater circuit 70 that warms, with the coolant water, a heater core 75 serving as a vehicle-cabin radiator that heats air guided into the vehicle cabin of the vehicle 1 through the air duct 2, and a three-way valve 7 serving as a shutting off mechanism that shuts off, when switched to a shut-off state, the communication between the engine-cooling circuit 60 and the heater circuit 70.

The engine-cooling circuit 60 has a coolant-water circulation path 63 serving as a first coolant-water circulation path in which the coolant water circulates through, a water pump 61 that circulates the coolant water in the coolant-water circulation path 63, and the radiator 62 that is provided so as to face against the evaporator 51 of the heat pump unit 4. The coolant water is circulated through the engine 9 of the vehicle 1 by the coolant-water circulation path 63. In addition, the coolant-water circulation path 63 is also capable of circulating the coolant water through the radiator 8 of the vehicle 1.

The radiator 62 performs the heat exchange with the evaporator 51. More specifically, the radiator 62 heats and evaporates the liquid cooling medium flowing in the evaporator 51. In FIG. 1, a configuration of the coolant-water circulation path 63 is shown with a part thereof being omitted. A specific configuration of the coolant-water circulation path 63 will be described in detail later with reference to FIG. 2.

The heater circuit 70 has a coolant-water circulation path 73 serving as a second coolant-water circulation path in which the coolant water circulates through, a water pump 71 that circulates the coolant water in the coolant-water circulation path 73, the heat absorber 72 that is provided so as to face against the condenser 52, and the heater core 75 that is provided in the air duct 2.

The heat absorber 72 performs the heat exchange with the condenser 52. More specifically, the heat absorber 72 cools the gaseous cooling medium flowing in the condenser 52.

The three-way valve 7 is switched by the instruction signal from the controller. When the three-way valve 7 is switched to a communication-state, a communication path 65 is opened, and the coolant-water circulation path 63 is communicated with the coolant-water circulation path 73. In this case, the coolant water that has been heated by the engine 9 is guided to the heater core 75 through the three-way valve 7. On the other hand, when the three-way valve 7 is switched to the shut-off state, the communication path 65 is closed and the communication between the coolant-water circulation path 63 and the coolant-water circulation path 73 is shut off. In this case, the coolant water is respectively circulated through the coolant-water circulation path 63 and through the coolant-water circulation path 73 in an independent manner. Instead of using the three-way valve 7, an open/close valve for switching the communication path 65 between the communication-state and the shut-off state may be used as a shutting off mechanism.

On the upstream side of the heater core 75 in the air duct 2, a mix door 76 is provided for adjusting the amount of air guided to the heater core 75 and the amount of air bypassing the heater core 75 from the air flowing through the air duct 2. The mix door 76 is operated by the instruction signal from the controller.

Next, the specific configuration of the coolant-water circulation path 63 will be described with reference to FIG. 2.

Figure 2:
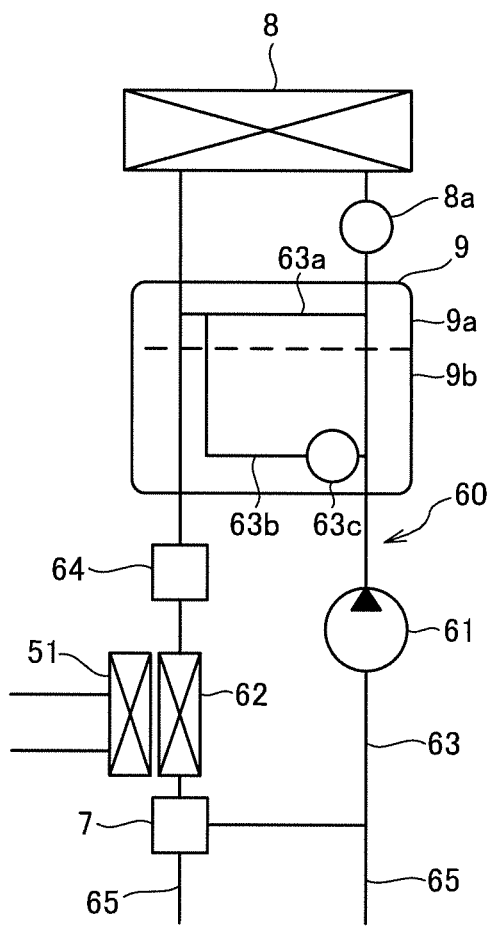
FIG. 2 is a configuration diagram describing a specific configuration of a first coolant-water circulation path.

As shown in FIG. 2, the engine 9 has a cylinder block 9b that is provided with a cylinder (not shown) in which a piston (not shown) reciprocates and a cylinder head 9a that is provided with a suction port (not shown) and an exhaust port (not shown) and fastened to a top part of the cylinder block 9b. During an warming-up operation of the engine 9 at the time of cold start, the temperature of the cylinder head 9a is increased at an earlier stage because the calorific value received by the cylinder head 9a by operation of the engine 9 is larger compared with that received by the cylinder block 9b due to the shorter distance from a combustion chamber.

The coolant-water circulation path 63 has a first coolant water path 63a that is formed in the cylinder head 9a and through which the coolant water flows, a second coolant water path 63b that is formed in the cylinder block 9b and through which the coolant water flows, and a thermostat 63c serving as a temperature open/close valve that is switched from a closed state to an opened state when the temperature of the coolant water guided to the second coolant water path 63b exceeds a predetermined temperature. In other words, the first coolant water path 63a is formed in a part of the engine 9, and the second coolant water path 63b is formed in another part of the engine 9 where the calorific value received by operation of the engine 9 is smaller compared with that received by the part at which the first coolant water path 63a is formed.

The coolant-water circulation path 63 has a thermostat 8a serving as a temperature open/close valve that is provided on the upstream side of the radiator 8 in a path of the coolant water through which the radiator 8 is communicated with the engine 9. The thermostat 8a is switched from a closed state to an opened state when the temperature of the coolant water guided to the radiator 8 exceeds a predetermined temperature. A predetermined temperature at which the thermostat 63c is switched to the opened state is set so as to be lower compared with a predetermined temperature at which the thermostat 8a is switched to the opened state.

The coolant-water circulation path 63 has an exhaust heat exchanger 64 in which the coolant water absorbs the heat from exhaust gas of the engine 9 at the downstream side of the engine 9 and at the upstream side of the position at which the evaporator 51 is provided. The exhaust heat exchanger 64 is, for example, an exhaust heat recovery device that recovers exhaust heat by absorbing the heat from exhaust gas exhausted from an exhaust gas pipe (not shown) or an EGR (Exhaust Gas Recirculation) cooler for cooling EGR gas that is provided in an EGR device (not shown) for returning a part of the exhaust gas to the suction side.

Action of the vehicle air-conditioning device 100 will be described below with main reference to FIGS. 3 to 10.

In the vehicle air-conditioning device 100, the air introduced from the air intake port 21 to the air duct 2 is first guided to the heat pump unit 4 by the blower 31. In the heat pump unit 4, the air flowing through the air duct 2 is cooled and dehumidified by the heat exchange with the evaporator 45.

The air that has passed the evaporator 45 is divided by the mix door 76 into the air to be guided to the heater core 75 and the air bypassing the heater core 75. The air guided to the heater core 75 is warmed by the heat exchange with the heater core 75. The air that has been warmed by the heater core 75 and the air that has bypassed the heater core 75 are mixed again, and the mixed air is guided into the vehicle cabin. As described above, in the vehicle air-conditioning device 100, the temperature and humidity of the air that has been introduced to the air duct 2 from the air intake port 21 is adjusted, and then, guided into the vehicle cabin.

Next, respective operation modes will be described with reference to FIGS. 3 to 8. In FIGS. 3 to 8, paths through which the cooling medium or the coolant water circulates are shown with thick solid lines, and paths in which circulation of the cooling medium or the coolant water is stopped are shown with broken lines.

In the vehicle air-conditioning device 100, a heating-operation is performed in an engine heating-operation mode in which the coolant-water circulation path 63 is communicated with the coolant-water circulation path 73 by the three-way valve 7 or in a heat pump heating-operation mode in which the communication between the coolant-water circulation path 63 and the coolant-water circulation path 73 is shut off by the three-way valve 7 and the heat pump unit 4 is driven.

<Cooling Medium Recovery Mode>

Figure 3:
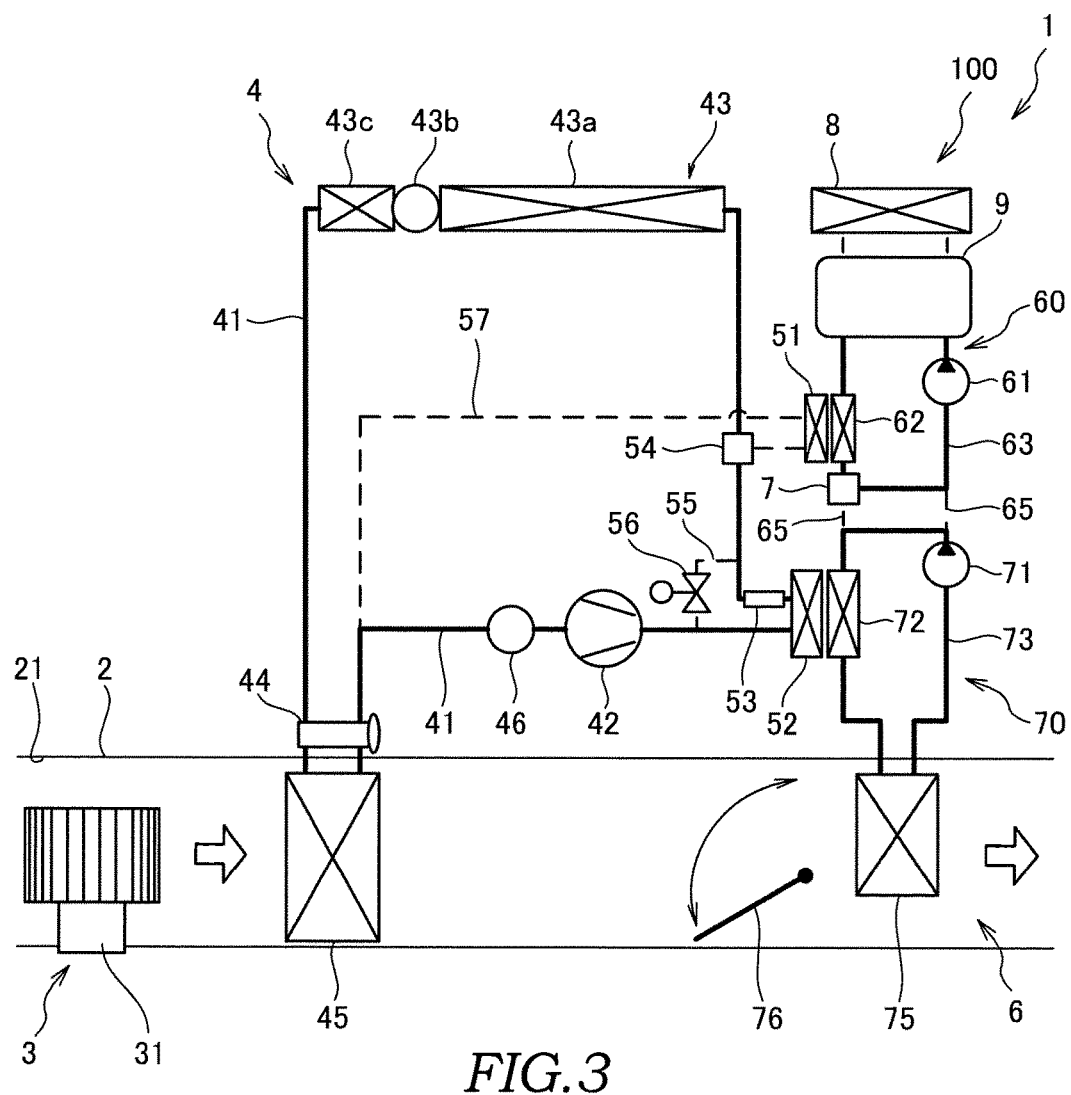
FIG. 3 is a diagram describing a cooling medium recovery mode of a vehicle air-conditioning device.

An operation in a cooling medium recovery mode is performed at least once when the cooling-operation is switched to the heating-operation, for example, at the beginning of a season when the heating-operation is required, such as the end of autumn or the beginning of winter. Alternately, the operation in a cooling medium recovery mode is also performed when a dehumidifying-heating-operation is switched to the heating-operation. The operation in the cooling medium recovery mode is performed continuously, for example, for about one minute, and thereafter, the operation is switched to the heating-operation. As shown in FIG. 3, in the cooling medium recovery mode, the three-way valve 54 is switched to a state in which the cooling medium is guided to the outside heat exchanger 43. The open/close valve 56 is switched to the closed state. The three-way valve 7 is switched to the shut-off state.

By doing so, in the heat pump unit 4, the cooling medium that has been compressed by the electric compressor 42 is cooled by passing through the condenser 52, and a part thereof is liquefied. Next, the cooling medium is decompressed by passing through the orifice 53 and is evaporated at the outside heat exchanger 43. At this time, the outside heat exchanger 43 functions as an evaporator. The cooling medium that has turned into a gaseous phase is then guided to the evaporator 45 through the expansion valve 44 and is supplied again to the electric compressor 42 through the accumulator 46. At this time, the coolant water is respectively circulated through the coolant-water circulation path 63 and through the coolant-water circulation path 73 in an independent manner.

As described above, in the vehicle air-conditioning device 100, by performing the operation in the cooling medium recovery mode, the pressure in the outside heat exchanger 43 is reduced by the orifice 53, and thereby, the cooling medium in the outside heat exchanger 43 is evaporated, and the cooling medium is sucked into the electric compressor 42. Thus, it is possible to recover the liquid cooling medium that has underwent liquefaction in the outside heat exchanger 43 and to secure the amount of the cooling medium circulating in the heat pump heating-operation mode. In the vehicle air-conditioning device 100, by performing the operation in the cooling medium recovery mode, a preparation for performing the heating-operation in the heat pump heating-operation mode is performed.

<Heat Pump Heating-Operation Mode>

Figure 4:
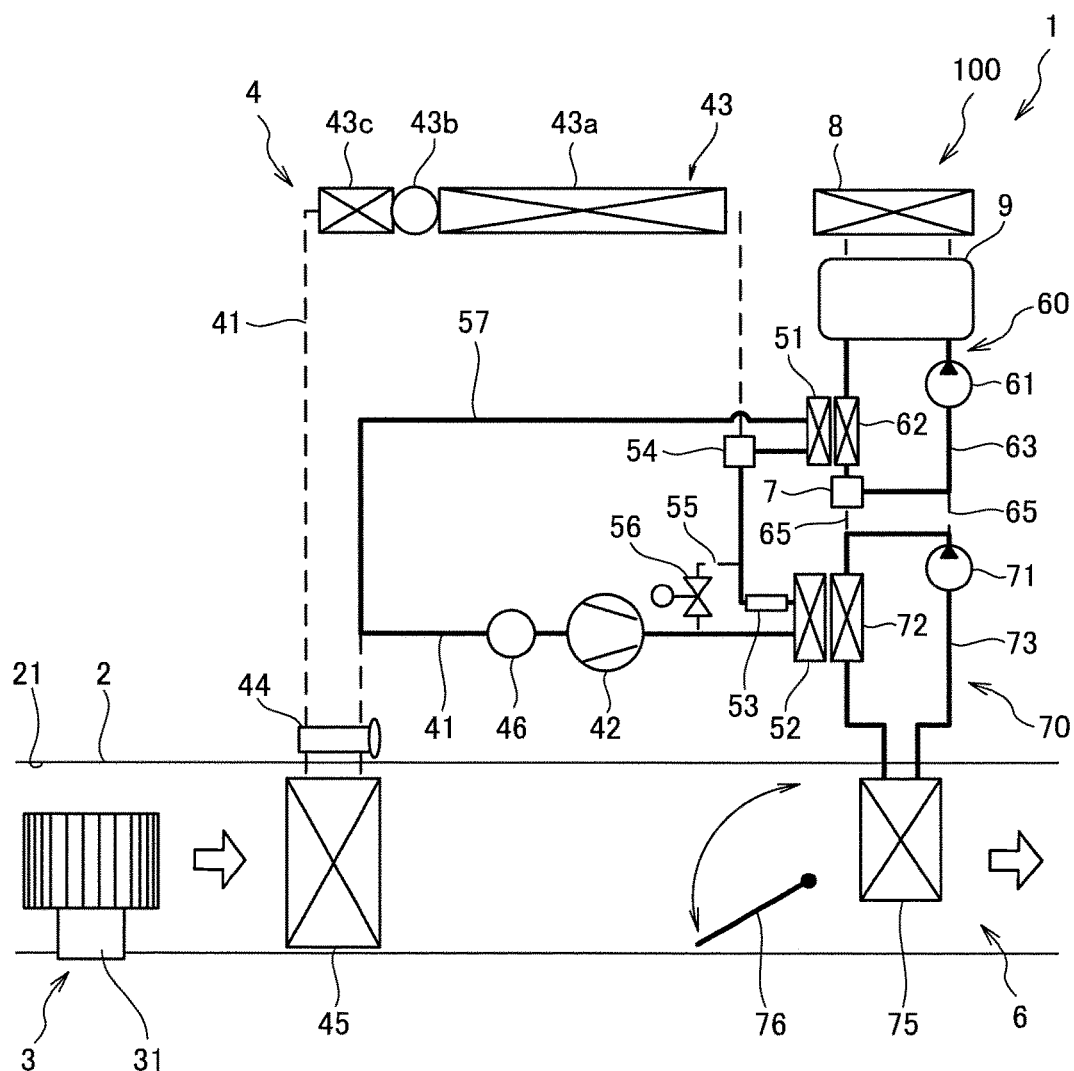
FIG. 4 is a diagram describing a heat pump heating-operation mode of the vehicle air-conditioning device.

The operation in the heat pump heating-operation mode is performed in a state in which the temperature of the coolant water is relatively low. As shown in FIG. 4, in the heat pump heating-operation mode, the three-way valve 54 is switched to a state in which the cooling medium is guided to the evaporator 51. The open/close valve 56 is switched to the closed state. The three-way valve 7 is switched to the shut-off state.

By doing so, in the heat pump unit 4, the cooling medium that has been compressed by the electric compressor 42 is cooled by passing through the condenser 52 and the orifice 53, and a part thereof is liquefied. At this time, the heat of the cooling medium is transferred from the condenser 52 to the heat absorber 72, and the coolant water in the heater circuit 70 is warmed.

The cooling medium that has passed through the orifice 53 is guided to the evaporator 51 through the three-way valve 54. In the evaporator 51, the heat is transferred from the coolant water in the radiator 62 to the cooling medium in the evaporator 51, and thereby, the cooling medium is warmed. Thus, a part of or all of the cooling medium that has been guided to the evaporator 51 is evaporated and guided to the return path 57. The cooling medium that has been warmed at the evaporator 51 is supplied again to the electric compressor 42 through the accumulator 46. At this time, the coolant water is respectively circulated through the coolant-water circulation path 63 and through the coolant-water circulation path 73 in an independent manner.

As described above, in the heat pump heating-operation mode, the heat is transferred via the cooling medium by the heat pump unit 4 from the engine-cooling circuit 60 to the heater circuit 70. Thus, in the vehicle air-conditioning device 100, the heating-operation is performed by warming the heater core 75 with the heat of the engine 9 that has been transferred by the heat pump unit 4.

At this time, because the communication between the coolant-water circulation path 63 and the coolant-water circulation path 73 is shut off by the three-way valve 7, the coolant water circulating in the coolant-water circulation path 73 is prevented from being reheated after cooled once. Therefore, it is possible to suppress deterioration of the energy efficiency caused by reheating of the coolant water.

Here, when the operation is performed in the heat pump heating-operation mode at the time of cold start of the engine 9, for example, the heat of the engine 9 is transferred to the coolant-water circulation path 73 through the heat pump unit 4 in order to warm the heater core 75. Thus, there is a risk in that the warming-up operation of the engine 9 takes long time.

In contrast, as shown in FIG. 2, with the engine-cooling circuit 60, the coolant-water circulation path 63 has the first coolant water path 63a that is formed in the cylinder head 9a and the second coolant water path 63b that is formed in the cylinder block 9b. Because the thermostat 63c is in the closed state while the temperature of the coolant water is relatively low, the coolant water passes through the first coolant water path 63a but not the second coolant water path 63b. Thus, because the coolant water only passes through the cylinder head 9a that is positioned closer to the combustion chamber and the temperature of which is increased at an earlier stage while the temperature of the coolant water is relatively low, it is possible to effectively warm the coolant water without losing the warmth of the cylinder block 9b.

In addition, the coolant-water circulation path 63 has the exhaust heat exchanger 64 in which the coolant water absorbs the heat from the exhaust gas of the engine 9. Thus, it is possible to also warm the coolant water with the heat of the exhaust gas of the engine 9 before the coolant water undergoes the heat exchange with the evaporator 51. Thus, it is possible to start the operation of the heat pump unit 4 at an earlier stage and to perform the warming-up operation of the engine 9 quickly.

When the temperature of the coolant water circulating the coolant-water circulation path 63 exceeds a predetermined temperature, the thermostat 63c is switched from the closed state to the opened state. By doing so, the coolant water passes through both first coolant water path 63a and second coolant water path 63b. Thus, the coolant water is warmed by the heat of both of the cylinder head 9a and the cylinder block 9b.

<Engine Heating-Operation Mode>

Figure 5:
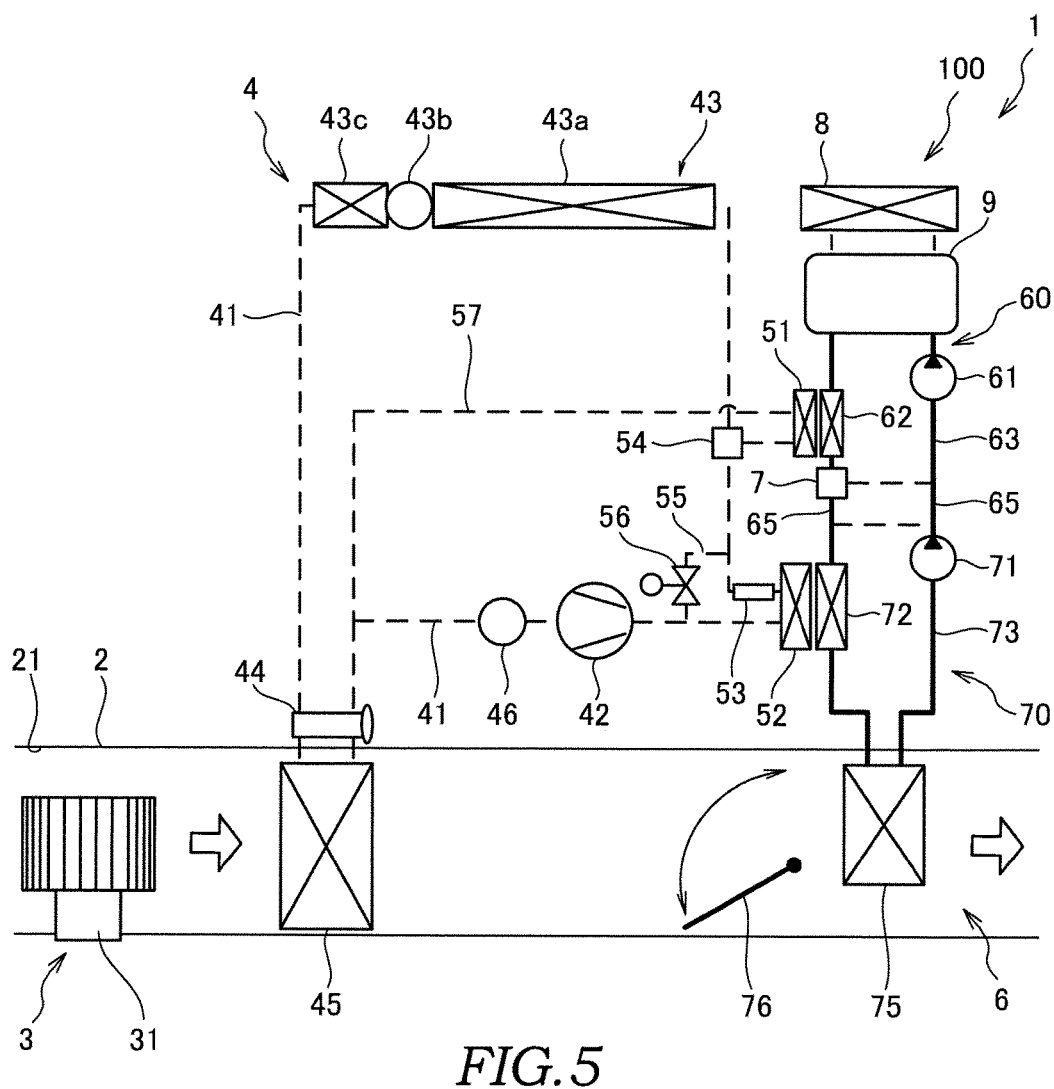
FIG. 5 is a diagram describing an engine heating-operation mode of the vehicle air-conditioning device.

The operation in the engine heating-operation mode is performed in a state in which the temperature of the coolant water is higher compared with that in the heat pump heating-operation mode. As shown in FIG. 5, in the engine heating-operation mode, the operation of the electric compressor 42 is stopped, and the cooling medium is not circulated in the heat pump unit 4. The three-way valve 7 is switched to the communication-state.

By doing so, the coolant-water circulation path 63 is communicated with the coolant-water circulation path 73, and the coolant water that has been warmed at the engine 9 is guided to the heater core 75. Thus, in the vehicle air-conditioning device 100, the heating-operation is performed by warming the heater core 75 with the heat of the engine 9.

Figure 6:
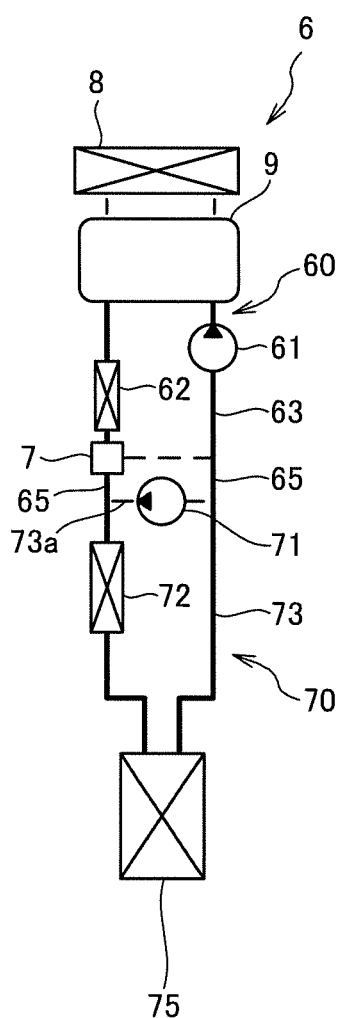
FIG. 6 is a configuration diagram describing a modification of a heater unit.

As shown in FIG. 6, it may be possible to provide the water pump 71 on a communication path portion 73a of the coolant-water circulation path 73 through which the coolant water does not pass when the three-way valve 7 is switched to the communication-state and through which the coolant water passes only when the three-way valve 7 is switched to the shut-off state. In this case, it is possible to perform the heating-operation in the engine heating-operation mode by stopping the operation of the water pump 71 and by operating only the water pump 61.

<Cooling-Operation Mode>

Figure 7:
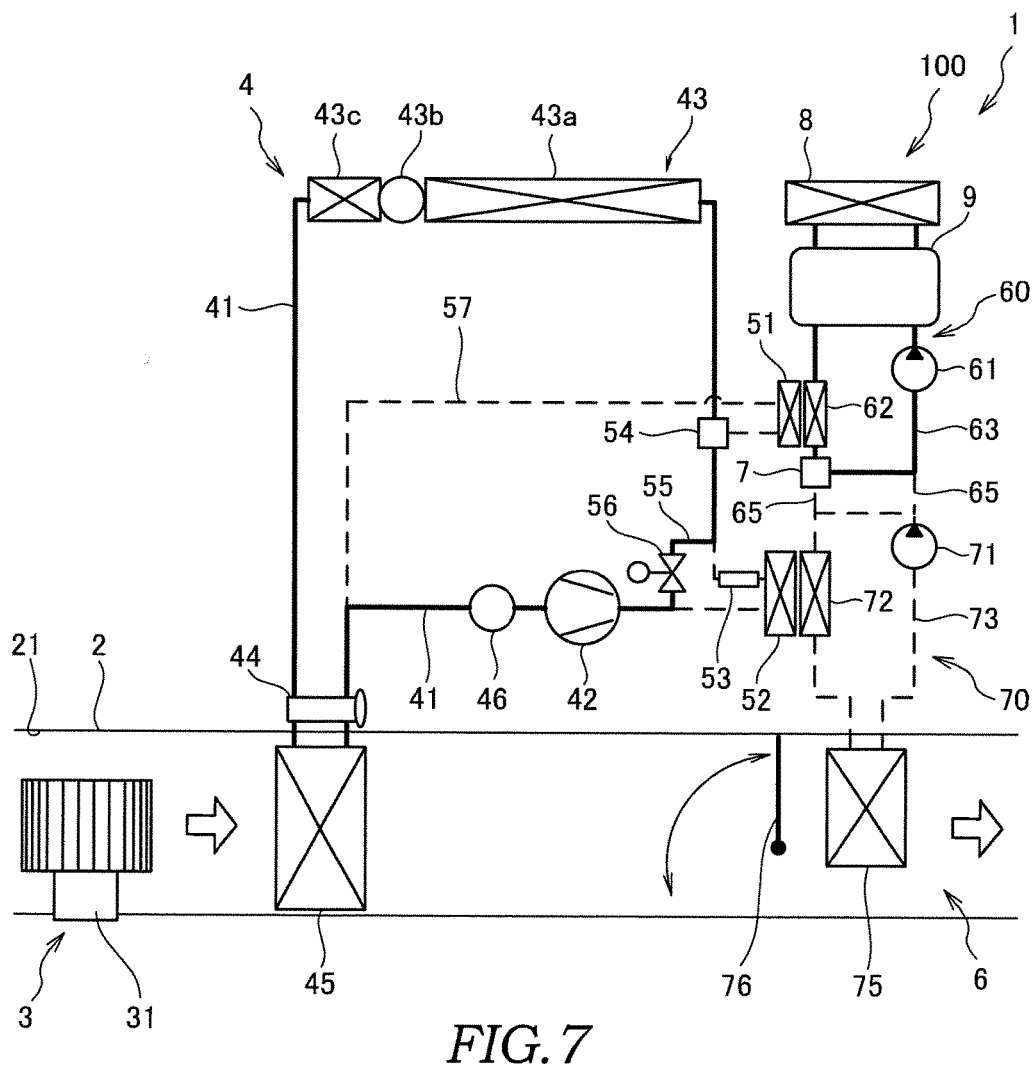
FIG. 7 is a diagram describing a cooling-operation mode of the vehicle air-conditioning device.

As shown in FIG. 7, in the cooling-operation mode, the three-way valve 54 is switched to a state in which the cooling medium is guided to the evaporator 45. The open/close valve 56 is switched to the opened state.

By doing so, in the heat pump unit 4, the cooling medium that has been compressed by the electric compressor 42 is guided to a condenser through the open/close valve 56 and the three-way valve 54. The cooling medium that been guided to the outside heat exchanger 43 is liquefied by being cooled, and the temperature and the pressure of the cooling medium is further reduced at the expansion valve 44 and guided to the evaporator 45. The cooling medium that has been guided to the evaporator 45 is evaporated and guided to the accumulator 46. The cooling medium that has been guided to the accumulator 46 is supplied again to the electric compressor 42.

When the cooling-operation is performed at the maximum capacity, as shown in FIG. 7, the three-way valve 7 is switched to the shut-off state, and the operation of the water pump 71 is sopped. Thus, because the coolant water does not circulate through the coolant-water circulation path 73, the heater core 75 is prevented from being warmed. In addition, at this time, the mix door 76 is closed such that the air flowing through the air duct 2 is not guided to the heater core 75. Thus, the air that has been cooled and dehumidified by the evaporator 45 is guided into the vehicle cabin without being warmed so as to maintain its low temperature.

On the other hand, when the cooling-operation is performed at non-maximum capacity, the three-way valve 7 may be switched to the communication-state. By doing so, the coolant-water circulation path 63 is communicated with the coolant-water circulation path 73, and the coolant water that has been warmed at the engine 9 is guided to the heater core 75. Thus, because the heater core 75 is warmed, the amount of the air to be guided to the heater core 75 and the amount of the air bypassing the heater core 75 from the air flowing through the air duct 2 are adjusted by the mix door 76.

By increasing the flow amount of the air to be guided to the heater core 75 of the air flowing through the air duct 2 by adjusting the position of the mix door 76, the dehumidifying-heating-operation in which the air that has been dehumidified at the evaporator 45 is warmed by the heater core 75 and guided into the vehicle cabin is performed.

<Coldness-Storing Mode>

Figure 8:
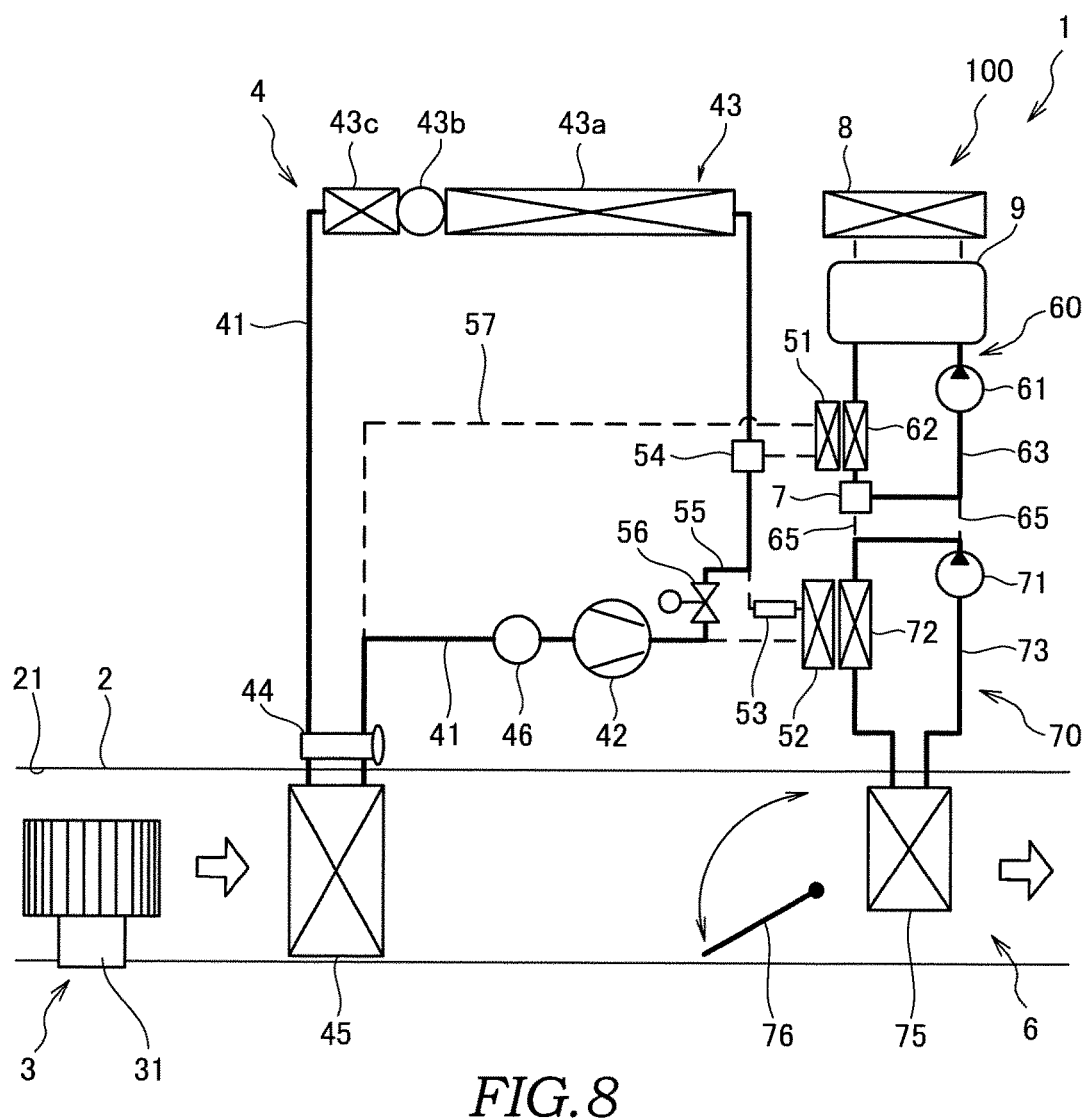
FIG. 8 is a diagram describing a coldness-storing mode of the vehicle air-conditioning device.

The operation in a coldness-storing mode is mainly performed at the time of the cooling-operation during a hot season. In addition, the operation in the coldness-storing mode is performed in a state in which the engine 9 is stopped. As shown in FIG. 8, in the coldness-storing mode, similarly to the cooling-operation mode, the three-way valve 54 is switched such that the cooling medium is guided to the evaporator 45, and the open/close valve 56 is switched to the opened state. In addition, in the coldness-storing mode, the three-way valve 7 is switched to the shut-off state.

By doing so, the coolant water is respectively circulated through the coolant-water circulation path 63 and through the coolant-water circulation path 73 in an independent manner. Thus, the coolant water that has been warmed at the engine 9 is not guided to the heater core 75. Thus, the coldness is stored in the coolant water in the coolant-water circulation path 73 by the air that has been cooled and dehumidified by passing through the evaporator 45 in the air duct 2 and that has been guided to the heater core 75. By allowing the coolant water into which the coldness is stored to flow through the heater core 75 at the time of the cooling-operation, it is possible to cool the air in the air duct 2. Thus, it is possible to suppress the energy consumption at the time of the cooling-operation.

Figure 9:
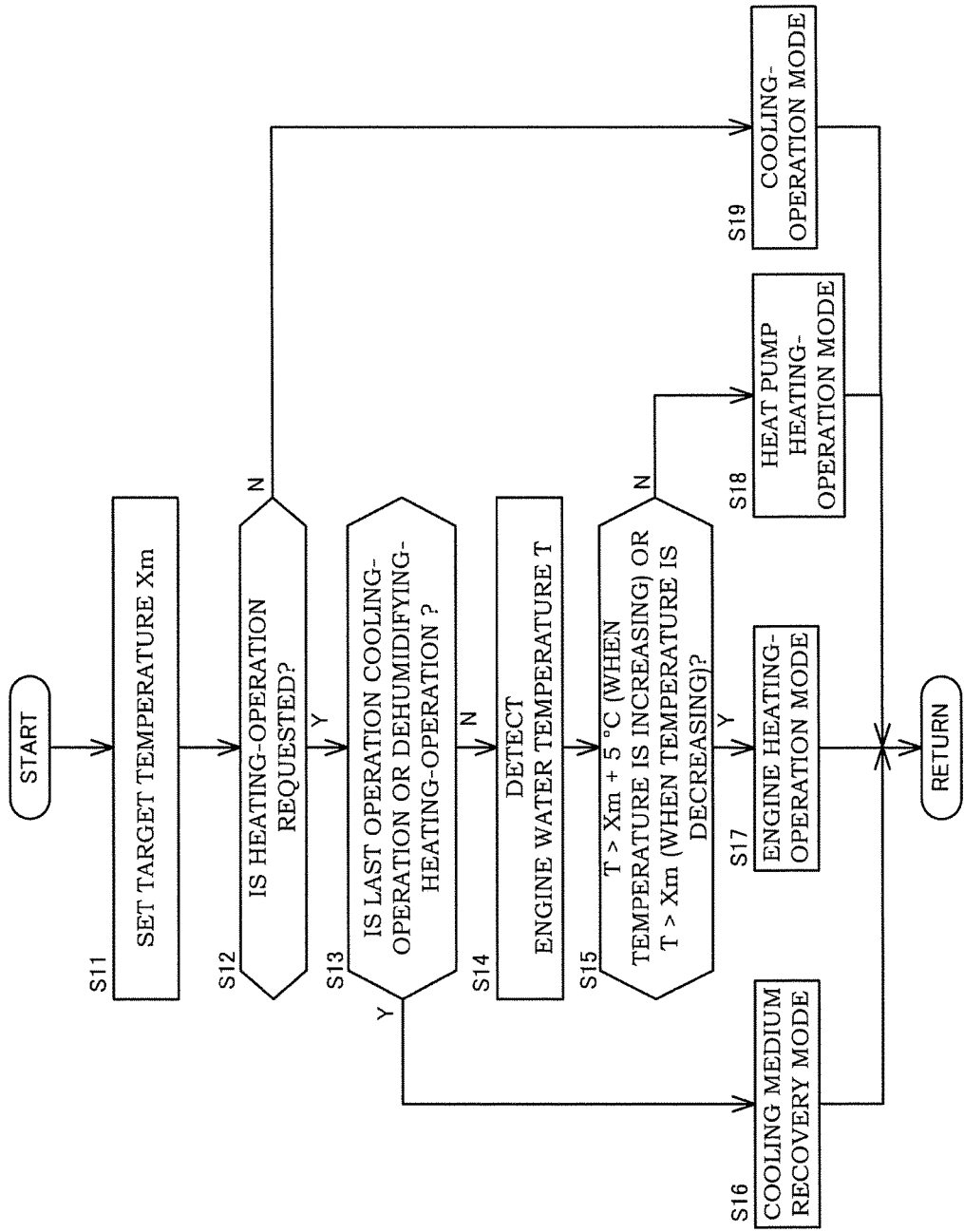
FIG. 9 is a flowchart describing an operation-mode switching control of the vehicle air-conditioning device according to a first embodiment of the present invention.

Next, an operation-mode switching control in the vehicle air-conditioning device 100 will be described with reference to FIG. 9. A controller repeatedly executes the routine process shown in FIG. 9 at fixed time intervals, for example, at every 10 milliseconds.

In Step S11, a target temperature Xm [° C.] is set. This target temperature Xm [° C.] is the temperature of the coolant water of the engine 9 at which the heating-operation in the engine heating-operation mode can be performed.

In Step S12, the vehicle air-conditioning device 100 judges whether or not the heating-operation is to be performed. In Step S12, when it is judged by the vehicle air-conditioning device 100 that the heating-operation is to be performed, the process proceeds to Step S13. On the other hand, in Step S12, when it is judged by the vehicle air-conditioning device 100 that the heating-operation is not to be performed, the process proceeds to Step S19, and the cooling-operation in the cooling-operation mode is performed.

In Step S13, the vehicle air-conditioning device 100 judges whether or not the last operation was the cooling-operation or the dehumidifying-heating-operation. In Step S13, when it is judged by the vehicle air-conditioning device 100 that the last operation was the cooling-operation or the dehumidifying-heating-operation, the process proceeds to Step S16, and the operation in the cooling medium recovery mode is performed. On the other hand, in Step S13, when it is judged by the vehicle air-conditioning device 100 that the last operation was not the cooling-operation or the dehumidifying-heating-operation, the process proceeds to Step S14.

In Step S14, the temperature of the coolant water T [° C.] of the engine 9 is detected. More specifically, in Step S14, the temperature of the coolant water in the coolant-water circulation path 63 is detected.

In Step S15, it is judged whether or not T>Xm+5 is satisfied when the temperature of the coolant water T [° C.] is increased, or it is judged whether or not T>Xm is satisfied when the temperature of the coolant water T [° C.] is decreased. At this time, Xm+5 [° C.] corresponds to a first preset temperature, and Xm [° C.] corresponds to a second preset temperature. The first preset temperature only needs to be higher than the second preset temperature, and it is not limited to Xm+5 [° C.].

In Step S15, when it is judged that T>Xm+5 is satisfied when the temperature of the coolant water is increasing or when it is judged that T>Xm is satisfied when the temperature of the coolant water is decreasing, the process proceeds to Step S17, and the heating-operation in the engine heating-operation mode is performed. On the other hand, in Step S15, when it is judged that T≤Xm+5 is satisfied when the temperature of the coolant water is increasing, or when it is judged that T≤Xm is satisfied when the temperature of the coolant water is decreasing, the process proceeds to Step S18, and the heating-operation in the heat pump heating-operation mode is performed.

As described above, because the temperature of the coolant water is increased in a state in which the engine 9 is driven, the vehicle air-conditioning device 100 performs the heating-operation in the heat pump heating-operation mode when the temperature of the coolant water of the coolant-water circulation path 63 is equal to or lower than Xm+5 [° C.], and the vehicle air-conditioning device 100 performs the heating-operation by switching the mode to the engine heating-operation mode when the temperature of the coolant water of the coolant-water circulation path 63 is higher than Xm+5 [° C.].

On the other hand, because the temperature of the coolant water is decreased in a state in which the engine 9 is stopped, the vehicle air-conditioning device 100 performs the heating-operation in the engine heating-operation mode when the temperature of the coolant water of the coolant-water circulation path 63 is higher than Xm [° C.], and the vehicle air-conditioning device 100 performs the heating-operation in the heat pump heating-operation mode when the temperature of the coolant water of the coolant-water circulation path 63 is equal to or lower than Xm [° C.].

Next, the action of the operation-mode switching control of the vehicle air-conditioning device 100 at the time of the heating-operation will be described with reference to FIG. 10.

Figure 10:
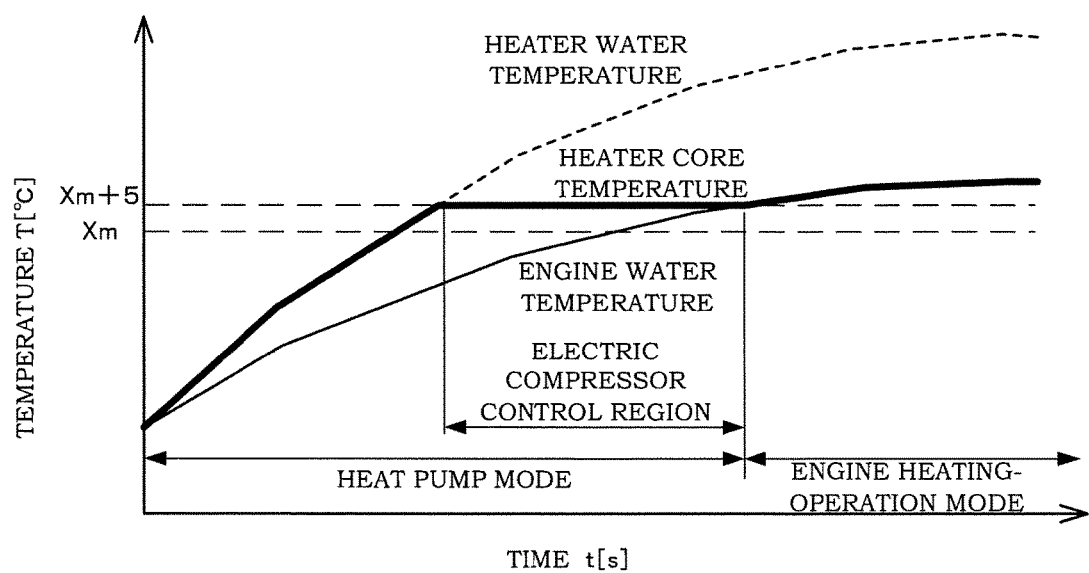
FIG. 10 is a time chart describing an action of the vehicle air-conditioning device.

In FIG. 10, the horizontal axis is taken as time t [s] and the vertical axis is taken as the temperature of the coolant water T [° C.]. In addition, in FIG. 10, the temperature of the coolant water of the engine 9 is shown by a solid line, the temperature of the coolant water of the heater core 75 when the electric compressor 42 is continuously operated at the maximum power is shown by broken line, and the actual temperature of the coolant water of the heater core 75 performing power control of the electric compressor 42 is shown by a thick solid line.

As shown in FIG. 10, as the operation of the vehicle air-conditioning device 100 is started, the temperature of the coolant water is increased by the heat of the engine 9. At this time, because the heating-operation is performed in the heat pump heating-operation mode, the heat of the coolant water in the coolant-water circulation path 63 is transferred to the coolant water in the coolant-water circulation path 73 by the heat pump unit 4. Thus, the temperature of the coolant water passing through the heater core 75 is increased at an earlier stage when compared with the temperature of the coolant water passing through the engine 9.

When the temperature of the coolant water passing through the heater core 75 is increased to Xm+5 [° C.], the power control of the electric compressor 42 is performed. More specifically, the controller adjusts the power of the electric compressor 42 such that the temperature of the coolant water passing through the heater core 75 is maintained at Xm+5 [° C.].

When the temperature of the coolant water passing through the engine 9 exceeds Xm+5 [° C.], the heating-operation is performed by switching the heat pump heating-operation mode to the engine heating-operation mode. At this time, because the coolant-water circulation path 63 is communicated with the coolant-water circulation path 73, the temperature of the coolant water passing through the heater core 75 becomes equal to the temperature of the coolant water passing through the engine 9.

As described above, in the heat pump heating-operation mode, because the heat of the engine 9 is transferred to the coolant-water circulation path 73 through the heat pump unit 4, the temperature of the coolant water of the coolant-water circulation path 63 passing through the engine 9 is increased before the temperature of the coolant water of the coolant-water circulation path 73 passing through the heater core 75 is increased. Thus, because the temperature of the heater core 75 is increased at an earlier stage, it is possible to reduce the operation time of the engine 9 for warming the heater core 75.

With the first embodiment described above, the following effects can be afforded.

In the vehicle air-conditioning device 100, by the heat pump unit 4, the heat is transferred via the cooling medium from the coolant-water circulation path 63 in which the coolant water passes through the engine 9 to the coolant-water circulation path 73 in which the coolant water passes through the heater core 75. In addition, the communication between the coolant-water circulation path 63 and the coolant-water circulation path 73 can be shut of by the three-way valve 7. Thus, in a state in which the three-way valve 7 is switched to the shut-off state, the coolant water circulating in the coolant-water circulation path 73 is prevented from being reheated after cooled once. Therefore, it is possible to suppress deterioration of the energy efficiency caused by reheating of the coolant water.

In addition, in the heat pump heating-operation mode, because the heat of the engine 9 is transferred to the coolant-water circulation path 73 through the heat pump unit 4, the temperature of the coolant water of the coolant-water circulation path 63 passing through the engine 9 is increased before the temperature of the coolant water of the coolant-water circulation path 73 passing through the heater core 75 is increased. Thus, because the temperature of the heater core 75 is increased at an earlier stage, it is possible to reduce the operation time of the engine 9 for warming the heater core 75.

Figure 11:
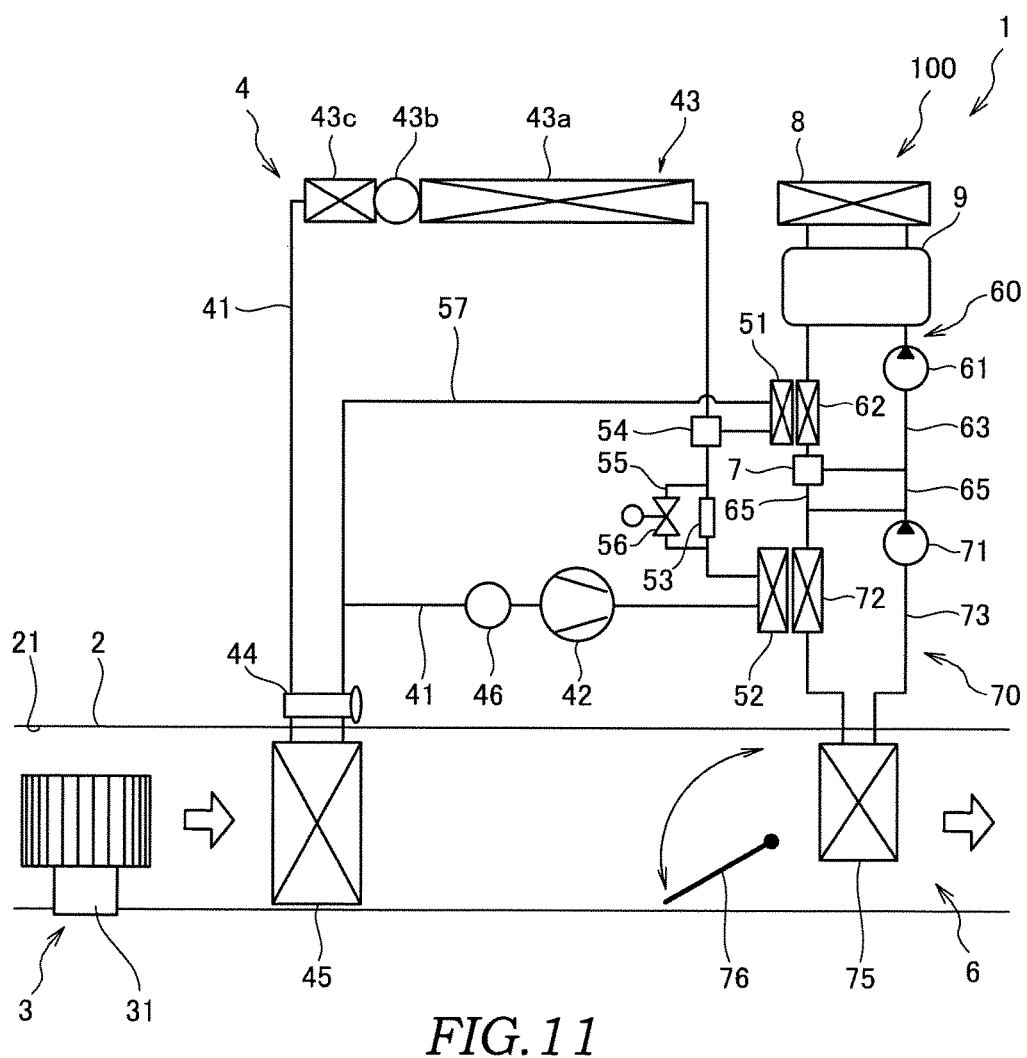
FIG. 11 is a configuration diagram of the vehicle air-conditioning device according to a modification of the first embodiment of the present invention.

As in a modification shown in FIG. 11, instead of using the configuration in which the bypass path 55 bypasses the condenser 52 the orifice 53, a configuration in which only the orifice 53 is bypassed may be used. Also in this case, similarly to the above-mentioned embodiment, it is possible to perform the operation in the cooling medium recovery mode, the heat pump heating-operation mode, the engine heating-operation mode, and the cooling-operation mode.

(Second Embodiment)

Figure 12:
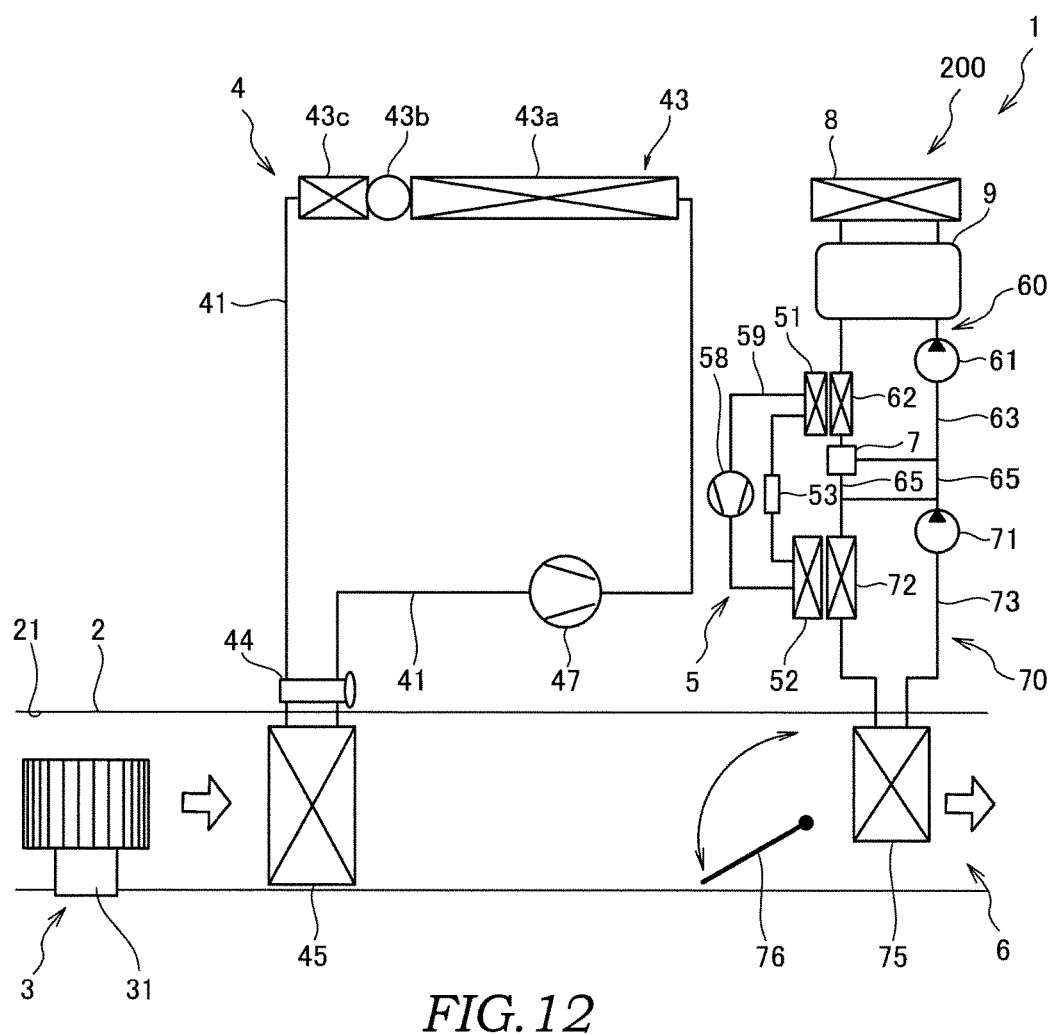
FIG. 12 is a configuration diagram of the vehicle air-conditioning device according to a second embodiment of the present invention.

Next, a vehicle air-conditioning device 200 according to a second embodiment of the present invention will be described with reference to FIG. 12. In the second embodiment, components that are similar to those in the first embodiment described above are assigned the same reference signs, and repetitive description thereof shall be omitted appropriately.

In the second embodiment, a belt driven compressor 47 is applied instead of the electric compressor 42. In addition, a sub-heat pump unit 5 serving as a sub-refrigeration cycle that transfers the heat of the coolant water in the coolant-water circulation path 63 to the coolant water in the coolant-water circulation path 73 is provided separately from the heat pump unit 4.

In the second embodiment, as in the first embodiment, the operation can be performed in the heat pump heating-operation mode, the engine heating-operation mode, the cooling-operation mode, and the coldness-storing mode. In the second embodiment, the operation in the cooling medium recovery mode needs not be performed.

The heat pump unit 4 has the cooling medium circulation circuit 41 through which the cooling medium for the cooling-operation circulates, the belt driven compressor 47 serving as a compressor that is driven by the engine 9 and compresses the cooling medium, the outside heat exchanger 43 that cools and condenses the cooling medium that has been compressed by the belt driven compressor 47, the expansion valve 44 that lowers temperature of the condensed cooling medium by decompressing and expanding the cooling medium, and the evaporator 45 that cools the air flowing through the air duct 2 with the cooling medium that has been expanded and the temperature of which has been lowered.

The sub-heat pump unit 5 has a cooling medium circulation circuit 59 through which the cooling medium circulates, the evaporator 51 that absorbs the heat from the coolant water in the engine-cooling circuit 60, the condenser 52 that releases the heat of the cooling medium that has absorbed the heat at the evaporator 51 to the coolant water in the heater circuit 70, the orifice 53 that decompresses the cooling medium that has passed through the condenser 52, and an electric compressor 58 that is smaller than the electric compressor 42.

In the heat pump heating-operation mode, the three-way valve 7 is switched to the shut-off state. By doing so, the coolant water is respectively circulated through the coolant-water circulation path 63 and through the coolant-water circulation path 73 in an independent manner.

In addition, in the vehicle air-conditioning device 200, the heat is transferred from the engine-cooling circuit 60 to the heater circuit 70 via the cooling medium by the sub-heat pump unit 5. Thus, in the vehicle air-conditioning device 200, the heating-operation is performed by warming the heater core 75 with the heat of the engine 9 that has been transferred by the sub-heat pump unit 5.

At this time, because the communication between the coolant-water circulation path 63 and the coolant-water circulation path 73 is shut off by the three-way valve 7, the coolant water circulating in the coolant-water circulation path 73 is prevented from being reheated after cooled once. Therefore, it is possible to suppress deterioration of the energy efficiency caused by reheating of the coolant water.

On the other hand, in the engine heating-operation mode, the operation of the electric compressor 58 is stopped, and the cooling medium does not circulate through the sub-heat pump unit 5. The three-way valve 7 is switched to the communication-state.

By doing so, the coolant-water circulation path 63 is communicated with the coolant-water circulation path 73, and the coolant water that has been warmed at the engine 9 is guided to the heater core 75. Thus, in the vehicle air-conditioning device 200, the heating-operation is performed by warming the heater core 75 with the heat of the engine 9.

With the second embodiment described above, as in the first embodiment, by the sub-heat pump unit 5, the heat is transferred via the cooling medium from the coolant-water circulation path 63 in which the coolant water passes through the engine 9 to the coolant-water circulation path 73 in which the coolant water passes through the heater core 75. In addition, the communication between the coolant-water circulation path 63 and the coolant-water circulation path 73 can be shut off by the three-way valve 7. Thus, in a state in which the three-way valve 7 is switched to the shut-off state, the coolant water circulating in the coolant-water circulation path 73 is prevented from being reheated after cooled once. Therefore, it is possible to suppress deterioration of the energy efficiency caused by reheating of the coolant water.

Embodiments of this invention were described above, but the above embodiments are merely examples of applications of this invention, and the technical scope of this invention is not limited to the specific constitutions of the above embodiments.

For example, in the above-mentioned embodiment, instead of using the electric compressor 42, a compressor that is belt driven by the engine may be used. Note that, in this case, when the engine is stopped, the heating-operation in the heat pump heating-operation mode is not performed, and the heating-operation in the engine heating-operation mode is performed.

This application claims priority based on Japanese Patent Application No. 2014-239715 filed with the Japan Patent Office on Nov. 27, 2014, and Japanese Patent Application No. 2015-227304 filed with the Japan Patent Office on Nov. 20, 2015, the entire contents of those are incorporated into this specification.

The invention claimed is:

1. A vehicle air-conditioning device having a vehicle-cabin radiator for heating air guided into a vehicle cabin of a vehicle, comprising:
    a first coolant-water circulation path in which coolant water passes through an engine;
    a second coolant-water circulation path communicated with the first coolant-water circulation path and in which the coolant water passes through the vehicle-cabin radiator;
    a shutting off mechanism configured to, when switched to a shut-off state, shut off communication between the first coolant-water circulation path and the second coolant-water circulation path; and
    a refrigeration cycle having a compressor configured to compress cooling medium, a secondary evaporator configured such that the cooling medium in the secondary evaporator absorbs heat from the coolant water in the first coolant-water circulation path, a secondary condenser configured to release heat of the cooling medium that has absorbed the heat at the secondary evaporator to the coolant water in the second coolant-water circulation path, and a secondary expander configured to decompress the cooling medium that has passed through the secondary condenser,
    a radiator configured to perform heat exchange with the secondary evaporator and which is provided in the first coolant-water circulation path, and
    a heat absorber configured to perform heat exchange with the secondary condenser and which is provided in the second coolant-water circulation path.

2. The vehicle air-conditioning device according to claim 1, wherein
    the first coolant-water circulation path includes
        a first coolant water path formed at a part of the engine and in which the coolant water passes through;
        a second coolant water path in which the coolant water passes through, the second coolant water path being formed at another part of the engine at which a calorific value generated by operation of the engine is smaller than that in the part at which the first coolant water path is formed; and a temperature open/close valve configured to be switched from a closed state to an opened state, when a temperature of the coolant water guided to the second coolant water path exceeds a predetermined temperature, such that the coolant water passes through the second coolant water path.

3. The vehicle air-conditioning device according to claim 2, wherein
the first coolant-water circulation path further includes, upstream of a position at which the secondary evaporator is provided in a flow of the coolant water in the first coolant-water circulation path, an exhaust heat exchanger in which the coolant water absorbs heat from exhaust gas of the engine.

4. The vehicle air-conditioning device according to claim 1, wherein the vehicle air-conditioning device is configured to perform a heating-operation in:
an engine heating-operation mode in which the first coolant-water circulation path is communicated with the second coolant-water circulation path by the shutting off mechanism; or
a heat pump heating-operation mode in which communication between the first coolant-water circulation path and the second coolant-water circulation path is shut off by the shutting off mechanism and the refrigeration cycle is operated.

5. The vehicle air-conditioning device according to claim 4, wherein
in a state in which the engine is operated, when a temperature of the coolant water in the first coolant-water circulation path is equal to or lower than a first preset temperature, the heating-operation is performed in the heat pump heating-operation mode, and when the temperature of the coolant water in the first coolant-water circulation path is higher than the first preset temperature, the heating-operation is performed in the engine heating-operation mode.

6. The vehicle air-conditioning device according to claim 5, wherein
in a state in which the engine is stopped, when the temperature of the coolant water in the first coolant-water circulation path is equal to or lower than a second preset temperature that is set so as to be lower than the first preset temperature, the heating-operation is performed in the heat pump heating-operation mode, and when the temperature of the coolant water in the first coolant-water circulation path is higher than the second preset temperature, the heating-operation is performed in the engine heating-operation mode.

7. The vehicle air-conditioning device according to claim 1, wherein
the refrigeration cycle further includes
an outside heat exchanger configured to cool the cooling medium by heat exchange with outside air;
a primary expander configured to decompress the cooling medium that has been cooled at the outside heat exchanger;
a primary evaporator configured to cool air to be guided into the vehicle cabin with the cooling medium that has been decompressed at the primary expander;
a switching valve configured to switch a state in which the cooling medium that has been compressed by the compressor is guided to the secondary evaporator and a state in which the cooling medium is guided to the primary evaporator; and
a bypass valve configured to circulate, when the switching valve is switched to an opened state, the cooling medium that has been compressed in the compressor by bypassing the secondary expander, and
wherein a cooling-operation is performed by switching the switching valve to the state in which the cooling medium is guided to the primary evaporator and by switching the bypass valve to the opened state.

* * * * *